United States Patent Office 2,824,088
Patented Feb. 18, 1958

2,824,088
TRIARYLAMINO-TRIAZINES AND PROCESS FOR THEIR MANUFACTURE

Robert Neher, Binningen, Switzerland, assignor to Ciba Pharmaceutical Products, Inc., Summit, N. J.

No Drawing. Application October 5, 1954
Serial No. 460,518

Claims priority, application Switzerland October 14, 1953

17 Claims. (Cl. 260—79.3)

This invention relates to triarylamino-triazines of the formula

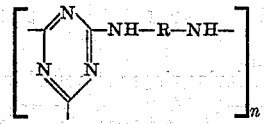

in which all the triazine rings are bound to one another by —HN—R—NH— radicals and every triazine ring carbon atom not bound to another triazine ring by such a radical is bound to a radical of the formula

—HN—R—NH$_2$ and in which $n$ represents a whole number such that the molecular weight of the compound is greater than 4000, and also salts of the aforesaid compounds. In the above formula R represents a radical of the formula Ar or Ar—Z—Ar and in which Ar represents an arylene radical substituted by a free or esterified sulfonic acid group and Z represents a direct bond or a bridge member. As an esterified sulfonic acid group there may be mentioned more especially a sulfonic acid group esterified with a lower alkanol, e. g., methyl alcohol.

The triarylamino-triazines may contain further substituents, especially lower alkyl, e. g., methyl groups or additional free or esterified sulfonic acid groups, bound to the arylene radicals. A single compound of the above formula may contain different radicals.

The invention relates more especially to triarylamino-triazines of the above formula and salts thereof, in which R represents a radical which is substituted by a free or esterified sulfonic acid group and in which Ar represents a phenylene-(1:4)-radical and Z represents a direct bond or a divalent lower hydrocarbon radical, more especially a —C≡C—, —CH=CH— or —CH$_2$—CH$_2$— group, or an —NH—, —S— or —S—S— group, and $n$ represents a whole number such that the molecular weight is within the range of $10^4$ to $10^6$.

Especially valuable are triarylamino-triazines of the above formula, in which R represents a radical of the formula

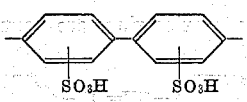

and of which the molecular weight is within the range of $10^4$ to $10^6$, or mixtures of such compounds having different values for $n$, and salts and esters thereof. There may be mentioned, more especially, the mixture of tri-arylamino-triazines of the above formula described in Example 1 below, in which R represents the radical

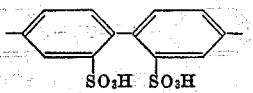

which mixture begins to decompose at 280° C. and consists principally of triarylamino-triazines of the above formula having an average molecular weight of about 30,000 and 420,000, and salts thereof.

The new compounds possess valuable pharmacological properties. Thus, they exhibit a pronounced anti-virus action. They are useful as medicaments, especially for combating virus diseases e. g. of the influenza-virus-group in human beings and animals, or as intermediate products for the manufacture of medicaments. Thus, in a concentration of $10^{-6}$ the aforesaid compounds check the growth of influenza virus (A, PR$_8$ and B, Lee) and New Castle disease virus in incubated chicken embryos. When administered to laboratory animals, for example, rabbits, the new compounds cause a definite change in the blood system. Thus intravenously applied virus keeps circulating for longer periods owing to a blocking effect of the compounds on virus receptors, i. e. a depressing effect on the primary sensitivity to the virus.

The invention also includes processes for making the new triarylamino-triazines. An advantageous process comprises reacting a compound of the formula

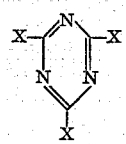

in which the X's represent exchangeable substitutents, advantageously halogen atoms such as chlorine atoms, with a diamine of the formula

H$_2$N—R—NH$_2$ wherein R has the same meaning as above, so that all the substitutents X enter into reaction. An alternative process comprises reacting intermediate products obtainable by the latter reaction with one another or with the aforesaid starting materials.

It is of advantage, for example, to react cyanuric chloride with the diamine, such as benzidine-2:2'-disulfonic acid, advantageously in the form of a metal salt thereof, such as the sodium salt, in aqueous solution at 90–100° C. In this manner all three of the chlorine atoms of the cyanuric chloride enter into reaction.

Alternatively the reaction may be carried out, for example, by first reacting the components together at such a temperature, for example, 20–60° C., that only one or two of the chlorine atoms of the cyanuric chloride enter into reaction, and then further reacting the intermediate product so formed at the higher temperature at which the second or third chlorine atom enters into reaction, whereby a complete reaction occurs. It is possible by adding other diamino-diaryls in the second and/or third stage to obtain compounds having diamino-diaryl radicals of different kinds.

It is also possible to subject different diamines simultaneously to the reaction so that mixed compounds or mixtures are produced.

When mixtures of triarylamino-triazines are obtained they may be separated from one another by methods in themselves known, for example, physical methods.

It may however be of advantage to use the mixtures as such, since they may possess an improved action owing to synergistic effects.

Depending on the process used the new compounds are obtained in the form of their free sulfonic acids, their esters or their salts. Esters or salts may be converted by hydrolysis into the free acids, and from the free acids the salts can be obtained by reaction with bases, such as metal hydroxides or carbonates, for example, alkali metal or alkaline earth metal hydroxides or ammonia, or by esterification, for example, with diazomethane, the esters may be made.

Instead of using the free amines, there may be used as starting materials compounds which react as free amines under the conditions of reaction. Sulfonic acids may be reacted in the form of their metal salts.

The reactions may be carried out in the presence or absence of diluents and/or catalysts and/or condensing agents, at the ordinary or a raised temperature, and in an open vessel or a closed vessel under pressure.

The new compounds can be used as medicaments, for example, in the form of pharmaceutical preparations, which contain the compound or a salt thereof in admixture with a pharmaceutical organic or inorganic carrier suitbale for enteral, parenteral or topical administration. For making such carriers there are used substances which do not react with the new compounds, for eaxmple, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example in the form of tablets, dragees, salves, creams or in liquid form as solutions, suspensions or emulsions. If desired they may be sterilized and/or may contain auxiliary substances, such as preserving agents, stabilizing agents, wetting or emulsifying agents, salts for regulating the osmotic pressure or buffers. They may also contain other therapeutically valuable substances, for example, anti-bacterials.

The following examples illustrate the invention:

*Example 1*

30 grams of benzidine-2:2'-disulfonic acid are dissolved in 200 cc. of water with the addition of the quantity of a 2 N-solution of sodium hydroxide calculated to give a neutral solution. 60 grams of crystalline sodium acetate in 300 cc. of water are added, then 12 grams of pulverized cyanuric chloride are added, and the whole is heated for 6 hours at 90° C. Undissolved material is then filtered off at 40° C. and the filtrate is adjusted to a pH value of 1 with concentrated hydrochloric acid. The precipitate is filtered off with suction, washed with a small amount of water and dried at 80° C. For the purpose of purification the product is dialyzed against water. The product so obtained corresponds to a mixture of triarylamino-triazines of the formula

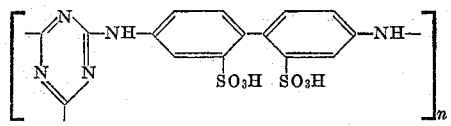

in which all the triazine rings are bound to one another by

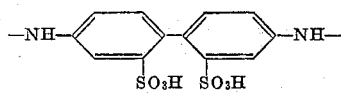

radicals and every triazine ring carbon atom not bound to another triazine ring by such a radical is bound to a radical of the formula

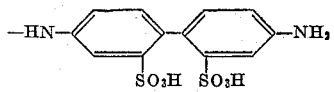

The product begins to decompose at 280° C., and is a pale grey product which dissolves to a clear solution in water, and forms a water-soluble alkali salt such as a sodium salt; it is prepared by dissolving the free acid in water and adding an amount of caustic soda until neutral. The sodium salt is readily isolated by salting out with sodium chloride.

Its diffusion constant $D$ is $55 \times 10^{-7}$ and its specific volume $1-V_\rho$ is 0.35. It also has two sedimentation constants, namely $S_{20}=15.7 \times 10^{-13}$ and $205 \times 10^{-13}$. It is therefore concluded that the main triarylamino-triazines present in the mixture have average molecular weight of about 30,000 and about 420,000.

*Example 2*

30 grams of 4:4'-diaminostilbene-2:2'-disulfonic acid are dissolved in 500 cc. of water with the addition of the calculated quantity of a 2 N-solution of caustic soda, 56 grams of crystalline sodium acetate in 100 cc. of water and 11.5 grams of pulverized cyanuric chloride are added, and the whole is heated for 3 hours at 90° C. After filtering the reaction solution, precipitation is caused to take place therein by adding 1500 cc. of acetone and the precipitate is separated by centrifuging. The precipitate is then purified by dialysis against water. The product so obtained corresponds to a mixture of triarylamino-triazines of the formula

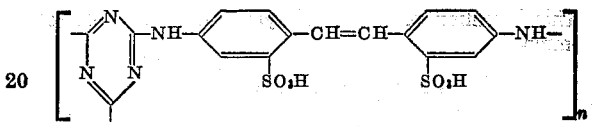

in which all the triazine rings are bound to one another by

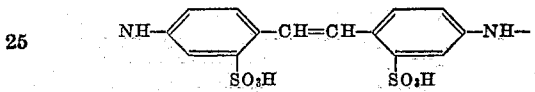

radicals and every triazine ring carbon atom not bound to another triazine ring by such a radical is bound to a radical of the formula.

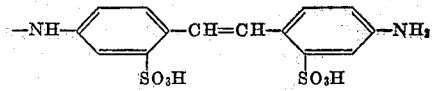

It is a yellow powder having a decomposition point above 300° C. and dissolves well in water as such and in the form of its ammonium salt, which is prepared by addition of ammonia to the solution of the free acid until neutral. Its diffusion constant $D=35 \times 10^{-7}$, its sedimentation constant $S_{20}=400 \times 10^{-13}$, and its specific volume $1-V=0.4$ which correspond to an average molecular weight of about 700,000.

*Example 3*

10 grams of triarylamino-triazine obtained as described in Example 2 are dissolved in 200 cc. of water, then mixed with 100 cc. of methanol and an excess of an ethereal solution of diazomethane is added, a copious evolution of nitrogen taking place while the mixture is vigorously agitated. When the evolution of gas ceases, the aqueous methanolic solution is separated and evaporated in vacuo at 40° C. The product so obtained corresponds to a triarylamino-triazine of the formula

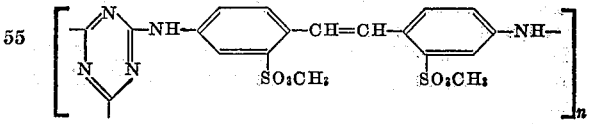

in which all the triazine rings are bound to one another by

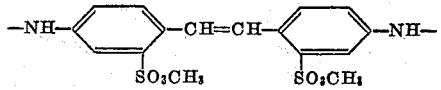

radicals and every triazine ring carbon atom not bound to another triazine ring by such a radical is bound to a radical of the formula

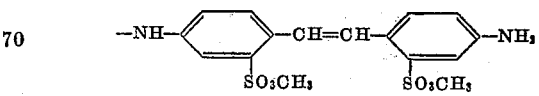

It is soluble in water, and its behavior in the ultra-centrifuge and also in diffusion tests is very similar to that of the starting material.

What is claimed is:
1. Triarylamino-triazines of the formula

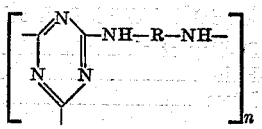

in which all the triazine rings are bound to one another by —NH—R—NH— radicals and every triazine ring carbon atom not bound to another triazine ring by such a radical is bound to a radical of the formula

—NH—R—NH$_2$ wherein R represents a radical of the formula

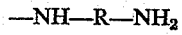

and wherein $n$ represents a whole number such that the molecular weight of the compound is within the range of $10^4$ to $10^6$.

2. Esters of the sulfonic acids claimed in claim 1.
3. Base salts of the sulfonic acids claimed in claim 1.
4. A triarylamino-triazine of the formula

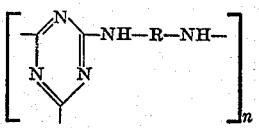

in which all the triazine rings are bound to one another by —NH—R—NH— radicals and every triazine ring carbon atom not bound to another triazine ring by such a radical is bound to a radical of the formula

—NH—R—NH$_2$ wherein R represents the radical

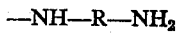

and which has an average molecular weight of about 30,000.

5. Esters of the sulfonic acids claimed in claim 4.
6. Base salts of the sulfonic acids claimed in claim 4.
7. A triarylamino-triazine of the formula

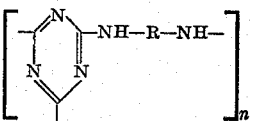

in which all the triazine rings are bound to one another by —NH—R—NH— radicals and every triazine ring carbon atom not bound to another triazine ring by such a radical is bound to a radical of the formula

—NH—R—NH$_2$ wherein R represents the radical

and which has an average molecular weight of about 420,000.

8. Esters of the sulfonic acids claimed in claim 7.
9. Base salts of the sulfonic acids claimed in claim 7.
10. A mixture of triarylamino-triazines of the formula

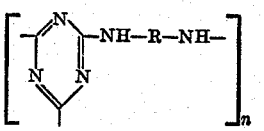

in which all the triazine rings are bound to one another by —NH—R—NH— radicals and every triazine ring carbon atom not bound to another triazine ring by such a radical is bound to a radical of the formula

—NH—R—NH$_2$ wherein R represents a radical of the formula

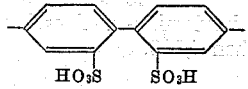

which mixture begins to decompose at 280° C. and consists principally of triarylamino-triazines of the above formula having an average molecular weight of about 30,000 and about 420,000.

11. A triarylamino-triazine of the formula

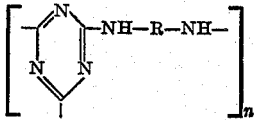

in which all the triazine rings are bound to one another by —NH—R—NH— radicals and every triazine ring carbon atom not bound to another triazine ring by such a radical is bound to a radical of the formula

—NH—R—NH$_2$ wherein R represents the radical

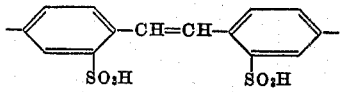

and which has an average molecular weight of 700,000.

12. Esters of the sulfonic acids claimed in claim 11.
13. Base salts of the sulfonic acids claimed in claim 11.
14. A member selected from the group consisting of triarylamino-triazines represented by the formula:

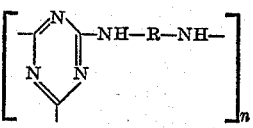

in which all the triazine rings are bound to one another by —NH—R—NH— radicals, and every triazine ring carbon atom not bound to another triazine ring by such a radical is bound to a radical of the formula

—NH—R—NH$_2$ wherein R represents a member selected from the group consisting of radicals of the formula: Ar, Ar—Ar and Ar—Z—Ar, Ar representing an arylene radical substituted by a member selected from the group consisting of free, esterified and saltified sulfonic acid groups, and Z a divalent lower hydrocarbon radical, and wherein $n$ represents a whole number of such that the molecular weight of the compound is greater than 4,000.

15. A composition according to claim 14 having a molecular weight within the range of $10^4$ to $10^6$.
16. A composition according to claim 14 wherein Ar comprises a phenylene-(1:4) radical.
17. A process for the manufacture of triarylamino-triazines which comprises heating a compound of the formula:

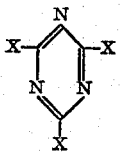

in which X represents a halogen atom, with a diamine of the formula: $N_2N$—R—$NH_2$, wherein R stands for a member selected from the group consisting of Ar, Ar—Ar and Ar—Z—Ar, Ar representing an arylene radical substituted by a member selected from the group consisting of free, esterified and saltified sulfonic acid groups and Z a divalent lower hydrocarbon radical, so as to produce triarylamino-triazines having a molecular weight greater than 4,000.

References Cited in the file of this patent

UNITED STATES PATENTS

| | | |
|---|---|---|
| 2,467,523 | Dudley et al. | Apr. 19, 1949 |
| 2,671,784 | Hein | Mar. 9, 1954 |
| 2,723,244 | Joyce | Nov. 8, 1955 |

FOREIGN PATENTS

| | | |
|---|---|---|
| 239,758 | Switzerland | Mar. 1, 1946 |
| 245,576 | Switzerland | Aug. 16, 1947 |